June 3, 1930.  T. C. VAN DEGRIFT  1,761,945
METHOD OF BALANCING AND APPARATUS THEREFOR
Filed Aug. 13, 1927   2 Sheets-Sheet 2
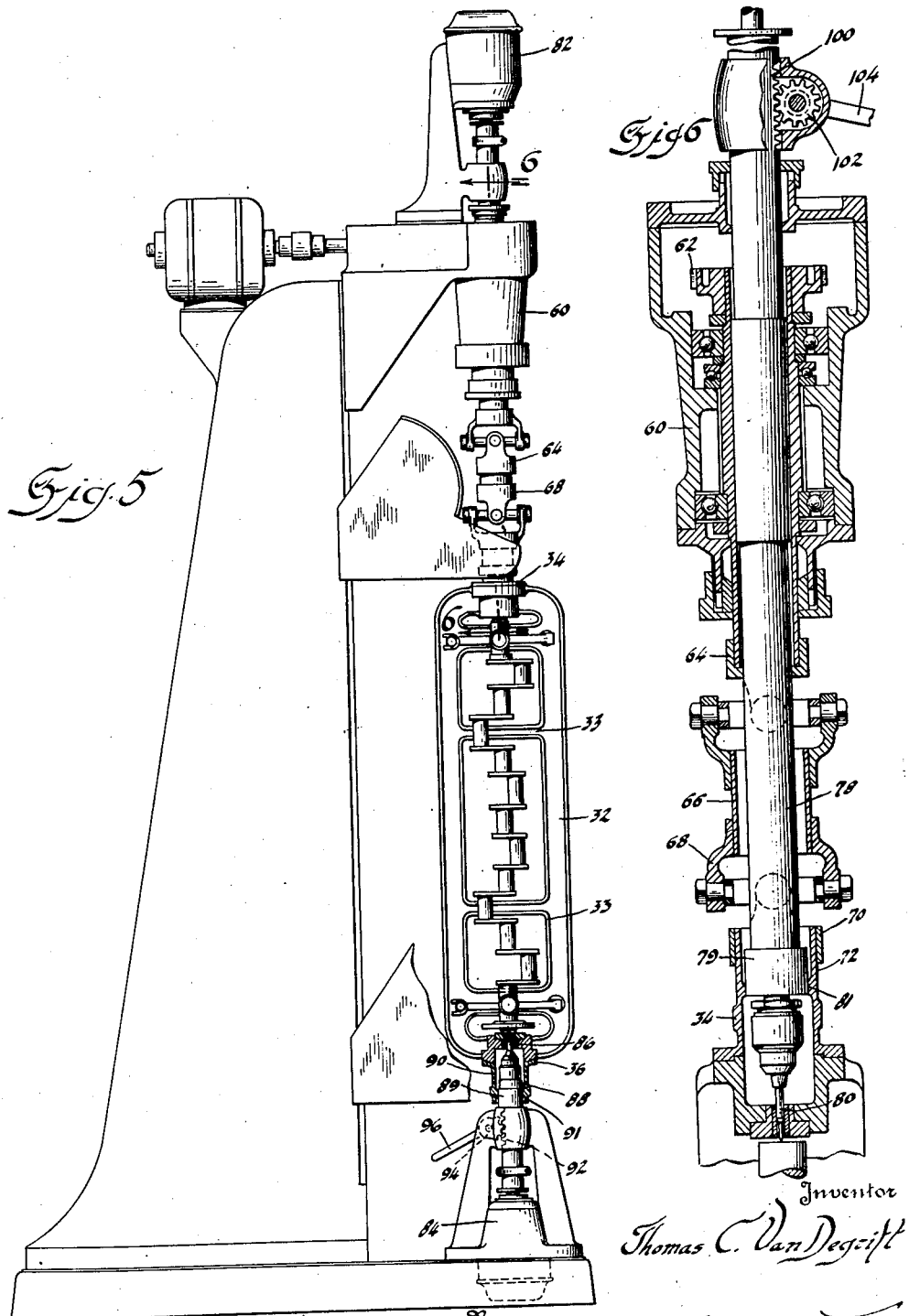

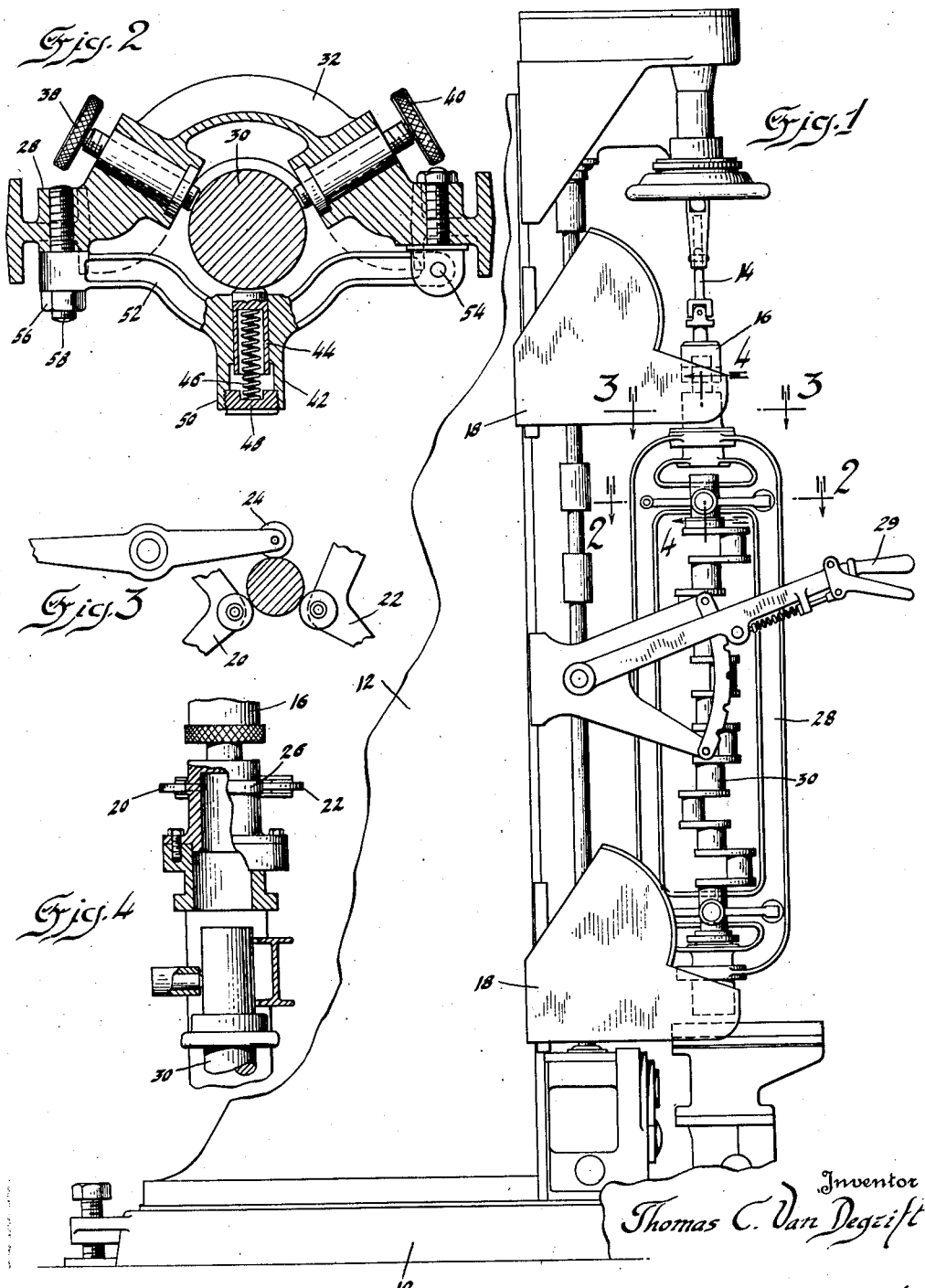

Patented June 3, 1930

1,761,945

UNITED STATES PATENT OFFICE

THOMAS C. VAN DEGRIFT, OF DETROIT, MICHIGAN, ASSIGNOR TO GENERAL MOTORS RESEARCH CORPORATION, OF DETROIT, MICHIGAN, A CORPORATION OF DELAWARE

METHOD OF BALANCING AND APPARATUS THEREFOR

Application filed August 13, 1927. Serial No. 212,818.

This invention is an improvement on the construction described and claimed in the prior application of Caleb E. Summers, Serial No. 188,384, filed May 21, 1927. The invention relates to an attachment for use with balancing machines of various types, but it is particularly designed for use with the balancing machine described and claimed in copending application, Serial No. 127,712, filed August 6th, 1926 by Caleb E. Summers and myself.

It has heretofore been common practice to establish the center lines of rotating parts such as crankshafts, armatures, and the like, hereinafter referred to generally as "the shaft," by methods based merely on surface symmetry. The axis thus defined is quite different from the axis with respect to which the shaft is in rotating balance, (hereinafter referred to as the "axis of rotating balance"), owing to variations in density throughout the mass. Consequently, in the subsequent balancing of the shaft, it was necessary to remove considerable quantities of metal in order to make the axis of rotating balance coincide with the line of centers arbitrarily established by considerations of surface symmetry.

According to the Summers application, a fixture is provided to receive the roughly forged shaft just after the center line has been thus arbitrarily established so that the forgings can be tested now and then for balance and dies corrected if need be to insure accuracy in the forgings so that the amount of metal required to be removed in subsequent balancing will be reduced to a minimum.

According to my invention, the rough forging is centered on the axis of rotating balance instead of along an axis determined by surface symmetry. To determine the location of the axis of rotating balance the forging or otherwise roughly shaped mass is subjected to a preliminary balancing operation. To accomplish this, the forging is adjustably mounted in a fixture, placed in a balancing machine and tested for balance. The shaft is then adjusted in the fixture and tested again, and this is repeated until a position of balance is arrived at. With the axis of balance thus determined, the ends of the shaft are bored along the axis and all subsequent machining operations, such as the turning of pins and journals, is performed as usual while the shaft is held upon this line of centers. By thus scientifically selecting the center line, it is found that in more than half of the cases the shaft, when completely machined and again tested for balance, will give an indication of balance well within the allowable manufacturing limits. These shafts consequently require no subsequent removal of metal and retesting to effect balance. It has also been found that where the finished shafts do show out of balance, the amount of out of balance is very small and but little machining is necessary to correct them. Thus, by scientifically selecting the center line, not only is a large percentage of the shafts found to be in balanced condition after the machining operations have been completed, but with the others only slight correction is required to attain balance. This is in contrast to the old methods in which, with the arbitrarily selected line of centers, practically all of the shafts are found to be out of balance by varying amounts and, in most cases, the amount of unbalance is so large as to require several successive corrections and tests for balance.

The older method was also entirely dependent on the accuracy of the dies used in the forging operation. Should the dies be faulty and lacking in symmetry, all of the shafts made with those dies would be out of balance. During use, the dies deteriorate and the out of balance of the shafts becomes greater. With my improved process, the dies are no longer controlling on the matter of balance for a slight shift in the center line, as determined by the balancing operation, will effect such a redistribution of masses with respect to the line that inaccuracies in the die are taken care of.

In some cases I have found it convenient to equip the balancing machine with means for drilling or otherwise marking the center line as determined in the balancing machine. This is particularly easily accomplished in a balancing machine of the type described in prior application of Caleb E. Summers and myself, Serial No. 127,712, previously referred to. This machine is equipped with an apparatus for rigidly locking the shaft or, in this case, the fixture in which the shaft is held, in position. While thus rigidly held, it is possible to drill the usual conical bores in the ends of the shaft by means of drill spindles, one of which may be projected downwardly thru hollow shafting constituting the rotating means into engagement with the upper end of the shaft, and the other of which may be extended upwardly from the base of the machine on a line with the first into engagement with the lower end of the shaft.

In the drawings, Figure 1 is a side elevation of a balancing machine showing my improved fixture in place and holding a shaft to be centered.

Figure 2 is a section on line 2—2 of Figure 1.

Figure 3 is a diagrammatic section on line 3—3 of Figure 1.

Figure 4 is a section on line 4—4 of Figure 1.

Figure 5 is a side elevation of a balancing machine with my fixture in place, this machine having incorporated in it means for drilling the centers in the ends of the shaft.

Figure 6 is an enlarged vertical section taken on substantially line 6—6 of Figure 5.

My balancing machine consists of a base 10 supporting a standard 12 carrying the rotating and indicating mechanism. The rotating mechanism consists of suitable gearing for effecting rotation of flexible shaft 14 carrying at its lower end coupling 16 for gripping the end of the shaft to be tested. The machine is equipped with indicating devices 18, one adjacent the top and one adjacent the bottom of the shaft, these indicating devices including roller carrying levers 20, 22 and 24 shown diagrammatically in Figure 3, the rollers engaging journals on the part to be tested. The movement of the levers 24 produced by eccentric motion of the ends of the part under test causes indications to be given by the indicating devices 18 of the amount and location of unbalance as clearly described in the aforesaid application, No. 127,712.

In the ordinary use of the machine described in the said application, the shaft is directly connected to the coupling member 16, is rotated, first with one end free and the other end held by locking the lever carrying rollers 20, 22, 24 at that end in engagement with the corresponding journal. An indicator 18 gives the amount and location of the unbalance at the free end of the shaft. The shaft is then rotated with the first-named end locked and the second-named end free and a corresponding reading is taken. The shaft is then removed from the machine and corrected for balance. If not then in balance, the operation is repeated.

According to my invention, the shaft 30 in the rough condition in which it is received from the forging dies is placed in holder 28, the holder having first been accurately balanced and provided with accurately machined top and bottom journals 26 for engagement with the respective top and bottom sets of rollers, 20, 22 and 24.

In Figure 2 I have shown the devices employed to secure the shaft in the holder. One of these devices is provided at each end of the holder and each consists of three radially adjustable members, 38, 40 and 42, the first two being in the form of set screws carried by the frame 28 and the last being in the form of a plunger 44 forced into engagement with the shaft 30 by means of spring 46, the outer end of which engages an adjustable plug 48 threaded in a boss 50 carried by a swinging collar 52 pivotally connected to the frame 32 at 54 and having its free end secured to the frame by means of nut 56 and bolt 58.

In operation, the shaft, or other articles to be balanced, is secured in the holder by swinging the collars 52 to one side, inserting the shaft and securing the collars in closed position. The holder with the shaft therein is then mounted in the balancing machine, the upper end being supported by coupling member 16. The holder and contained shaft are then tested for balance in the usual manner, as previously described, and the indications of out of balance at the top and bottom noted. Thereupon the set screws 38 and 40 at the top and bottom of the shaft are adjusted to effect displacement of the shaft so as to cause it to assume a position of balance. The holder and shaft are thereupon again rotated and should the indicators give an indication of balance, the holder is removed from the machine and the ends of the shaft are drilled along an axis concentric with the axis of the journals of the holder. The center line thus accurately established is found in most cases to substantially coincide with the axis of rotating balance, not only in the rough forging but also in the shaft when completely machined. Consequently, when thereafter testing the finished shafts for balance it is found that more than half require no correction while those which do show unbalance are so slightly out of balance as to require very little correction. By this means, the time and expense involved in obtaining balanced shafts is radically reduced.

In practice I have found it best to square off the ends of the shaft before balancing but this is not absolutely essential.

The modification shown in Figures 5 and 6 differs from that shown in the preceding figures only in that the drilling apparatus is incorporated in the machine so that the centers may be drilled without removing the holder from the machine. The holder 32 here shown is of slightly different construction in that intermediate cross ribs 33 are provided, these being bent out of plane of the frame proper in order to receive the shaft. The frame is provided with top and bottom journals, 34 and 36, as above, these journals being engaged by respective sets of rollers 20, 22 and 24, as shown diagrammatically in Figure 3. As clearly shown and described in the prior application, No. 127,712, these rollers are capable of being rigidly locked in engagement with the journals 34 and 36. In this form of my invention, the drive shaft 14 comprises, as shown in Figure 5, a hollow spindle 60 to the upper end of which is secured gear 62 driven by any suitable means. To the lower end of the spindle 60 is secured an universal joint 64, the lower member of which is secured to a second hollow spindle 66, to the lower end of which is secured a second universal joint 68. The lower end of the universal joint 68 carries a gripping collar 70 adapted to engage the upper end 72 of the journal extending from the upper end of the frame 32. Through the alined hollow shafts and universals extend bearing members 78 for drill spindle 80. Means is provided for raising and lowering the spindle, this means consisting of a rack 100 provided on an extension of the spindle bearing sleeve and a pinion 102 operated by handle 104. Normally, members 78 and 80 fit loosely within the portions of the drive shaft 14 in which the universal joints are incorporated so that the spindle and its bearing will not interfere with the free rotation of the frame. Upon rotation of handle 104 the spindle is projected downwardly, the enlarged portion 79 of bearing 78 snugly fitting guide surface 81 formed in the upper part of frame 32. The spindle 80 is driven by means of electric motor 82 mounted on the top of the machine.

The base of the machine similarly supports an electric motor 84 for driving drill spindle 86 journalled in bearings 88 normally loosely fitting within the journal 90 formed at the bottom of the frame 32. The spindle and its bearing are likewise provided with elevating means in the form of rack 92 and pinion 94 operated by handle 96 by means of which spindle 86 may be projected upwardly into engagement with the shaft. When in this position the enlarged portion 89 of bearing 88 is snugly received within guide cylinder 91 formed at the bottom of holder 32.

With this form of the apparatus, the operation of removing the frame and shaft from the machine for drilling the centers is eliminated.

In the interests of simplicity of disclosure, an effort has been made to eliminate the mass of details of the balancing machine to which my invention is shown applied. However, for a complete understanding of the mechanism indicating the out of balance of the holder and shaft and for locking the holder in position, reference must be had to the said prior application, Serial No. 127,712.

I claim:

1. The method of locating the axis of rotating balance of a shaft which consists in mounting the shaft in a frame, rotating the shaft and frame, observing the condition of balance of the shaft and, if found out of balance, shifting the shaft in the frame with respect to the axis of rotation until the shaft indicates balance, and marking the ends of the shaft at the points thereof which register with the axis of rotation.

2. A balancing machine including means for testing the work for rotating balance, a support for holding the work during the testing operation, and means for adjusting the work in the support to cause it to assume a position of balance.

3. In the combination as defined in claim 2, means associated with said support for marking the axis of balance.

4. In the combination as defined in claim 2, means for locking the support in balanced position, and means for marking the ends of the shaft, when so held, in line with the axis of rotation.

5. In the combination as defined in claim 2, said balancing machine comprising spaced indicating devices and said support being provided with spaced bearing portions concentric with the axis of balance of the support for engagement with said indicating devices.

6. A balancing machine including means for testing the shaft for rotating balance, a balanced support for holding the shaft during the testing operation, means for adjusting the shaft in the support to cause it to assume a position of balance, said support being apertured in line with the axis of rotation and means guided in said apertures for marking centers in the shaft.

7. A balancing machine comprising means for rotating the shaft to be balanced and indicating means, a frame suported by said rotating means, said frame being provided with adjustable means for shifting the shaft to cause it to assume a position of balance and means concentric with said rotating means for center boring the shaft when in balanced position.

8. A balancing machine fixture comprising a frame, spaced means on the frame for receiving parts of the shaft to be balanced, one of said means including adjustable devices adapted to shift the shaft in a direction transverse of its axis.

9. A balancing machine fixture comprising a frame, spaced means on the frame for receiving parts of the shaft to be balanced, each of said means comprising adjustable stops adapted to permit bodily shifting of the shaft.

10. A balancing machine fixture comprising a frame having a drive shaft engaging portion at one end and longitudinally spaced adjustable means on the frame arranged to receive axially spaced portions of the shaft to be tested and adapted to permit bodily shifting of the shaft in the frame.

11. A balancing machine fixture as defined in claim 10 having a plurality of annular bearing surfaces, one adjacent each end for cooperation with portions of the testing machine.

12. The method of locating the axis of rotating balance of a shaft which consists in mounting the shaft in a frame, and rotating the shaft and frame with one end held and the other end free, observing the condition of balance of the shaft at the free end thereof and, if found out of balance, rotating the shaft with the first named end free and the other end held, shifting the shaft in the frame with respect to the axis of rotation until it is in rotating balance, and marking the ends of the shaft to indicate the points thereof which register with the axis of rotation.

In testimony whereof I affix my signature.

THOMAS C. VAN DEGRIFT.